Patented Sept. 14, 1937

2,093,348

UNITED STATES PATENT OFFICE 2,093,348

PROCESS FOR THE REFINING OF MINERAL, VEGETABLE, OR ANIMAL OILS, PARAFFINS, WAXES, RESINS, AND THE LIKE

Johannes Benedict Carpzow, Bornsen, near Hamburg, Germany

No Drawing. Application December 30, 1935, Serial No. 56,838. In Germany March 22, 1935

14 Claims. (Cl. 87—12)

It is well known to subject mineral, vegetable or animal oils, paraffins, hydrocarbon waxes, ester waxes or resins and the like to a refining by treatment with considerable quantities of strong, more particularly concentrated sulphuric acid and thereupon with kieselguhr, bleaching earths, fuller's earth or Florida earth. In most cases the excess acid used had to be first of all neutralized with alkalies and the refined product washed several times with water.

It has now been found that the refining of substances of the said kind can be effected more simply and efficiently by first of all weakly acidifying the same in liquid form, or liquefied by heating or dissolution in suitable solvents, with only very small quantities, e. g. 0.1 to 5%, of an inorganic or organic acid and then treating them, e. g. shaking them, with about 2 to 20% by weight of the colloidal constituents of salt or fresh water mud in dry powder form consisting for the most part of chemically active silicon compounds which are either free from oxygen, like silicides of the type $SiMet_2$, and the silicon hydride or silicon alkyl compounds, or are poor in oxygen i. e. are unsaturated with respect to oxygen. Colloidal compounds of this kind can be obtained in the known manner in highly dispersed finely powdered form having a fineness of 17,000 to 18,000 mesh per $cm^2$ from numerous naturally moist salt or fresh water muds containing such compounds in quantities of up to about 60% by washing or centrifuging off the non-colloidal chemically inert constituents which are saturated with oxygen, such as sand, chalk, silicates and the like, and thereupon drying in the absence of air. When using such chemically active finely powdered colloid substances, in contradistinction to the known use of kieselguhr, clay, fuller's earth and the like, such a small quantity of acid proves to be sufficient that the same is completely absorbed or bound by the refining agent used so that a subsequent neutralization of the refined material by alkalies, as well as a subsequent washing of the same by water is superfluous. The refined product is then separated from the mud mass either by pressing off or in certain cases by distilling off. A further improvement of the refined material can be secured if the distillation is effected through further quantities of colloidal substances of the said kind which are rich in unsaturated silicon compounds and have been dried in the absence of air.

Example 1.—1000 parts by weight of a crude petroleum or petroleum distillate are acidified with 0.1 to 5% of concentrated sulphuric acid and are then mixed with 2 to about 20% of chemically active dry colloid substances in the form of a fine powder (the fineness being 17,000 to 18,000 mesh per $cm^2$) obtained from salt or fresh water muds and vigorously shaken from 10 to 30 minutes, whereupon the refined product is separated off by allowing the mixture to settle and then decanting or by pressing off or by distilling off from the purifying mass.

Example 2.—1000 parts by weight of crude paraffin are liquefied either by heating or dissolving in benzine, benzene or the like, thereupon acidified with 0.1 to 5% of concentrated sulphuric acid or hydrochloric acid and then shaken vigorously for 10 to 30 minutes with 2 to 20% of concentrated chemically active dry colloid substances from salt or fresh water muds in the form of a fine powder (the fineness being 17,000 to 18,000 mesh per $cm^2$), after which the refined product is separated by being pressed off from the purifying mass and, in certain cases freed from the solvent used by distillation insofar as a solvent has been used for effecting the conversion of the crude paraffin into a liquid form.

Example 3.—1000 parts by weight of crude unpurified olive oil are acidified with 0.1 to about 2% of concentrated sulphuric or hydrochloric acid or even with an organic acid, such as for example acetic acid or formic acid, and are then vigorously shaken for about 10 to 30 minutes with 2 to 20% of chemically active, dry colloid substances from salt or fresh water muds in the form of a fine powder (the powder being 17,000 to 18,000 mesh per $cm^2$), whereupon the refined material is pressed off cold or hot. In this way a pure bright oil is forthwith obtained.

Example 4.—1000 parts by weight of pinewood balsam are dissolved in alcohol or some other organic solvent, then acidified with 0.1 to 5% of an inorganic or organic acid, such as for example sulphuric acid, hydrochloric acid, acetic acid, formic acid, and then vigorously shaken for 10 to 30 minutes with 2 to 20% of chemically active dry colloid substances from salt or fresh water muds in the form of a fine powder (the fineness being 17,000 to 18,000 mesh per $cm^2$) after which the refined product is separated from the purifying mass by pressing off or the like and freed from solvent by distillation.

What I claim is:—

1. A process for refining mineral, vegetable or animal oils, paraffins, hydrocarbon waxes, ester waxes or resins consisting in weakly acidifying the product to be treated in fluid form with an acid, treating the weakly acidified product with chemically active, dry, finely powdered colloid substances from fresh or salt water mud, and separating the refined product from the refining agent.

2. A process for refining mineral, vegetable or animal oils, paraffins, hydrocarbon waxes, ester waxes or resins consisting in weakly acidifying the product to be treated in fluid form with an acid selected from the group: sulphuric acid, hydrochloric acid, acetic acid and formic acid, treating the weakly acidified product with chemically active, dry, finely powdered colloid substances from fresh or salt water mud, and separating the refined product from the refining agent.

3. A process for refining mineral, vegetable or animal oils, paraffins, hydrocarbon waxes, ester waxes or resins consisting in treating the product when in a liquid form by weakly acidifying the liquid product with an acid, treating the weakly acidified product with chemically active, dry, finely powdered colloid substances from fresh or salt water mud, and separating the refined product from the refining agent.

4. A process for refining mineral, vegetable or animal oils, paraffins, hydrocarbon waxes, ester waxes or resins consisting in heating the product to be treated for the purpose of converting it into a liquid form, weakly acidifying the liquefied product with an acid, treating the weakly acidified product with chemically active, dry, finely powdered colloid substances from fresh or salt water mud, and separating the refined product from the refining agent.

5. A process for refining mineral, vegetable or animal oils, paraffins, hydrocarbon waxes, ester waxes or resins consisting in dissolving the product to be treated in a solvent, weakly acidifying the solution with an acid, treating the weakly acidified solution with chemically active, dry, finely powdered colloid substances from fresh or salt water mud, and separating the refined product from the refining agent.

6. A process for refining mineral, vegetable or animal oils, paraffins, hydrocarbon waxes, ester waxes or resins consisting in weakly acidifying the product to be treated in fluid form with an acid, shaking up the weakly acidified product with chemically active, dry, finely powdered colloid substances from fresh or salt water mud, and separating the refined product from the refining agent.

7. A process for refining mineral, vegetable or animal oils, paraffins, hydrocarbon waxes, ester waxes or resins consisting in weakly acidifying the product to be treated in fluid form with an acid, treating the weakly acidified product with chemically active, dry, finely powdered colloid substances from fresh or salt water mud, and distilling the refined product from the refining agent.

8. A process for refining mineral, vegetable or animal oils, paraffins, hydrocarbon waxes, ester waxes or resins consisting in weakly acidifying the product to be treated in fluid form with an acid, treating the weakly acidified product with chemically active, dry, finely powdered colloid substances from fresh or salt water mud, and pressing the refined product off from the refining agent.

9. A process as claimed in claim 1 in which the acidification is effected with an inorganic acid.

10. A process as claimed in claim 1 in which the acidification is effected with an organic acid.

11. A process for refining mineral, vegetable or animal oils, paraffins, hydrocarbon waxes, ester waxes or resins consisting in weakly acidifying the product to be treated in fluid form with 0.1-5% of an acid, treating the weakly acidified product with chemically active, dry, finely powdered colloid substances from fresh or salt water mud, and separating the refined product from the refining agent.

12. A process for refining mineral, vegetable or animal oils, paraffins, hydrocarbon waxes, ester waxes or resins consisting in weakly acidifying the product to be treated in fluid form with an acid, treating the weakly acidified product with 2-20% of chemically active, dry, finely powdered colloid substances from fresh or salt water mud, and separating the refined product from the refining agent.

13. A process for refining mineral, vegetable or animal oils, paraffins, hydrocarbon waxes, ester waxes or resins consisting in weakly acidifying the product to be treated in fluid form with 0.1-5% of an acid, treating the weakly acidified product with 2-20% of chemically active, dry, finely powdered colloid substances from fresh or salt water mud, and separating the refined product from the refining agent.

14. A process as claimed in claim 5 in which the solvent is selected from benzene, benzine and alcohol.

JOHANNES BENEDICT CARPZOW.